July 20, 1965 J. S. DEMPSTER ETAL 3,195,749
CONTAINER LOADING AND UNLOADING MECHANISM
Filed Feb. 15, 1962 4 Sheets-Sheet 1
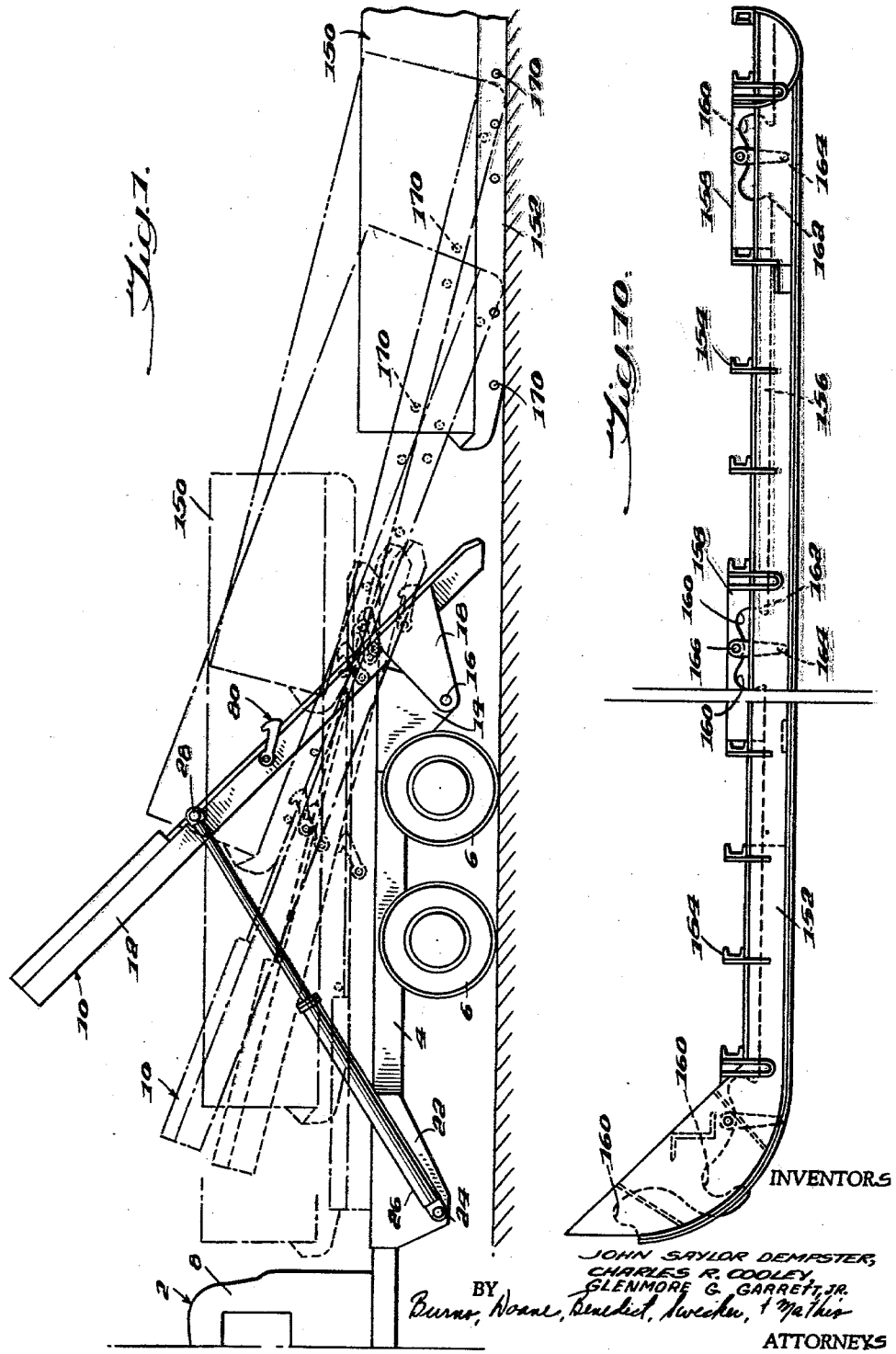
INVENTORS
JOHN SAYLOR DEMPSTER,
CHARLES R. COOLEY,
GLENMORE G. GARRETT, JR.
BY Burns, Doane, Benedict, Swecker, & Mathis
ATTORNEYS

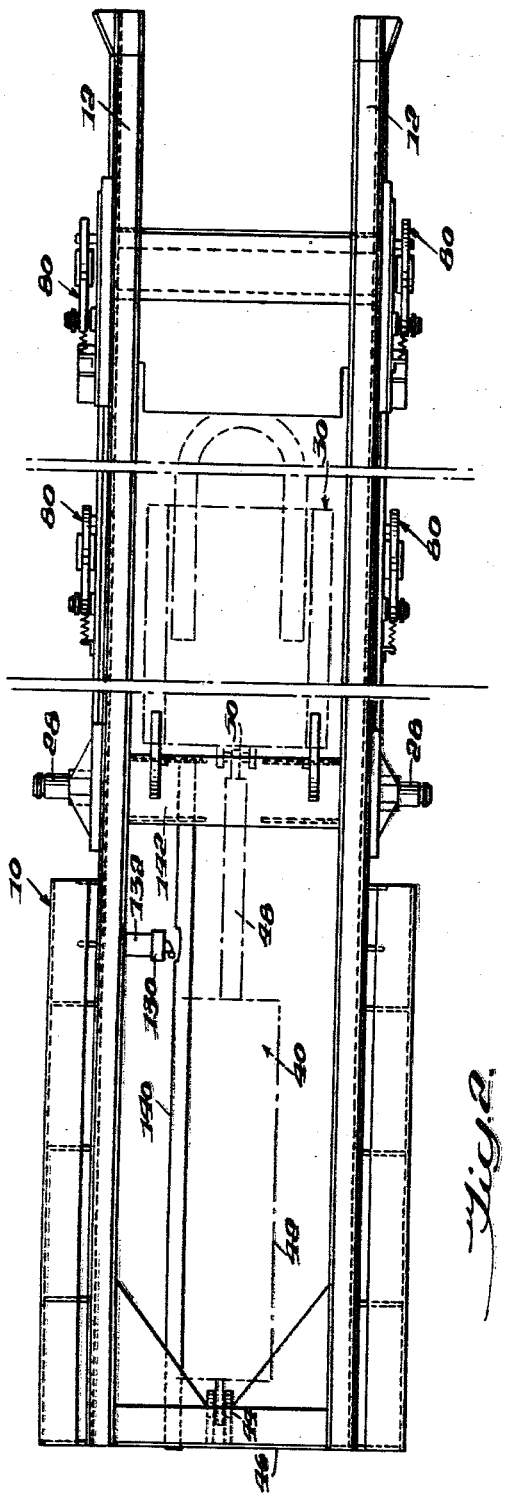

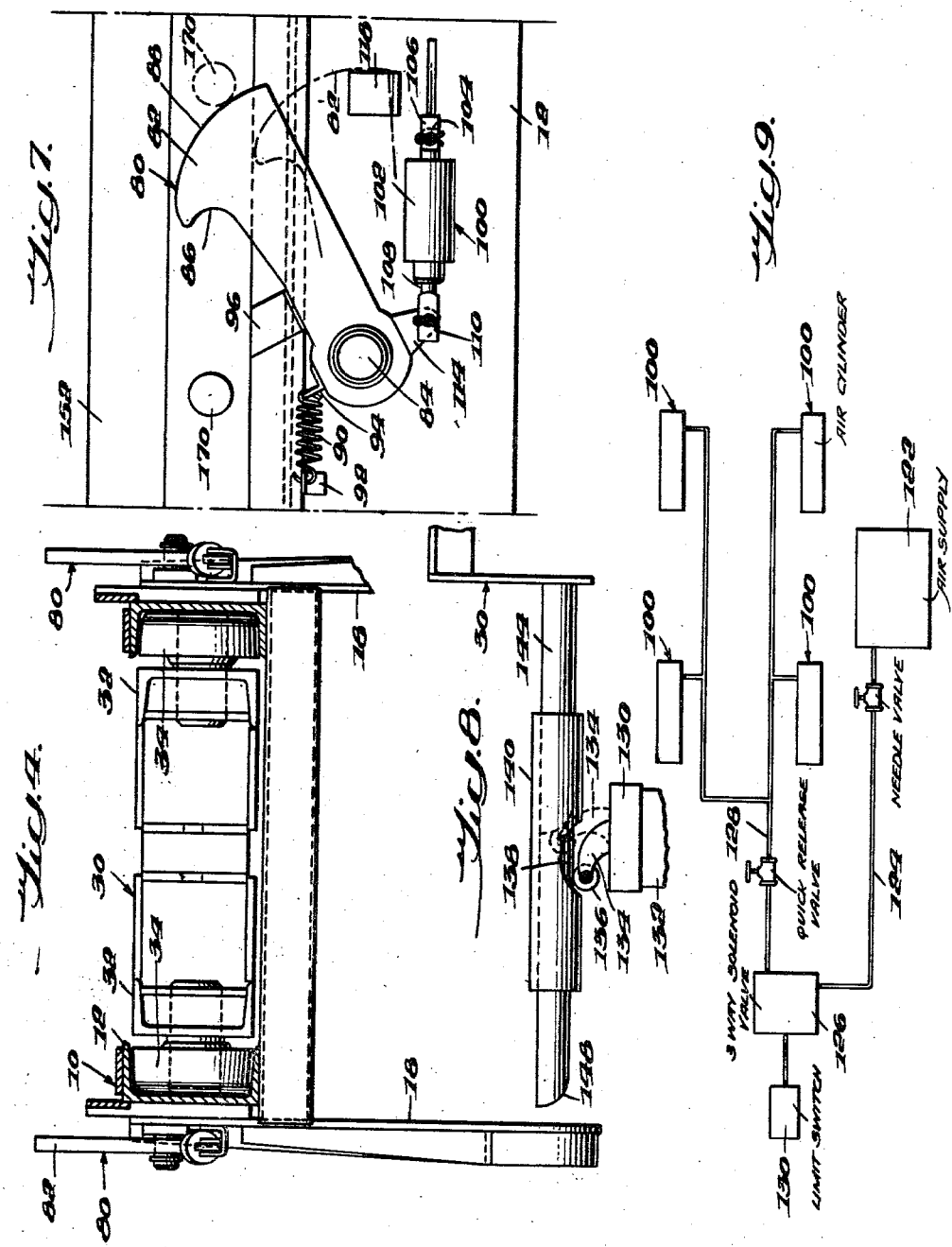

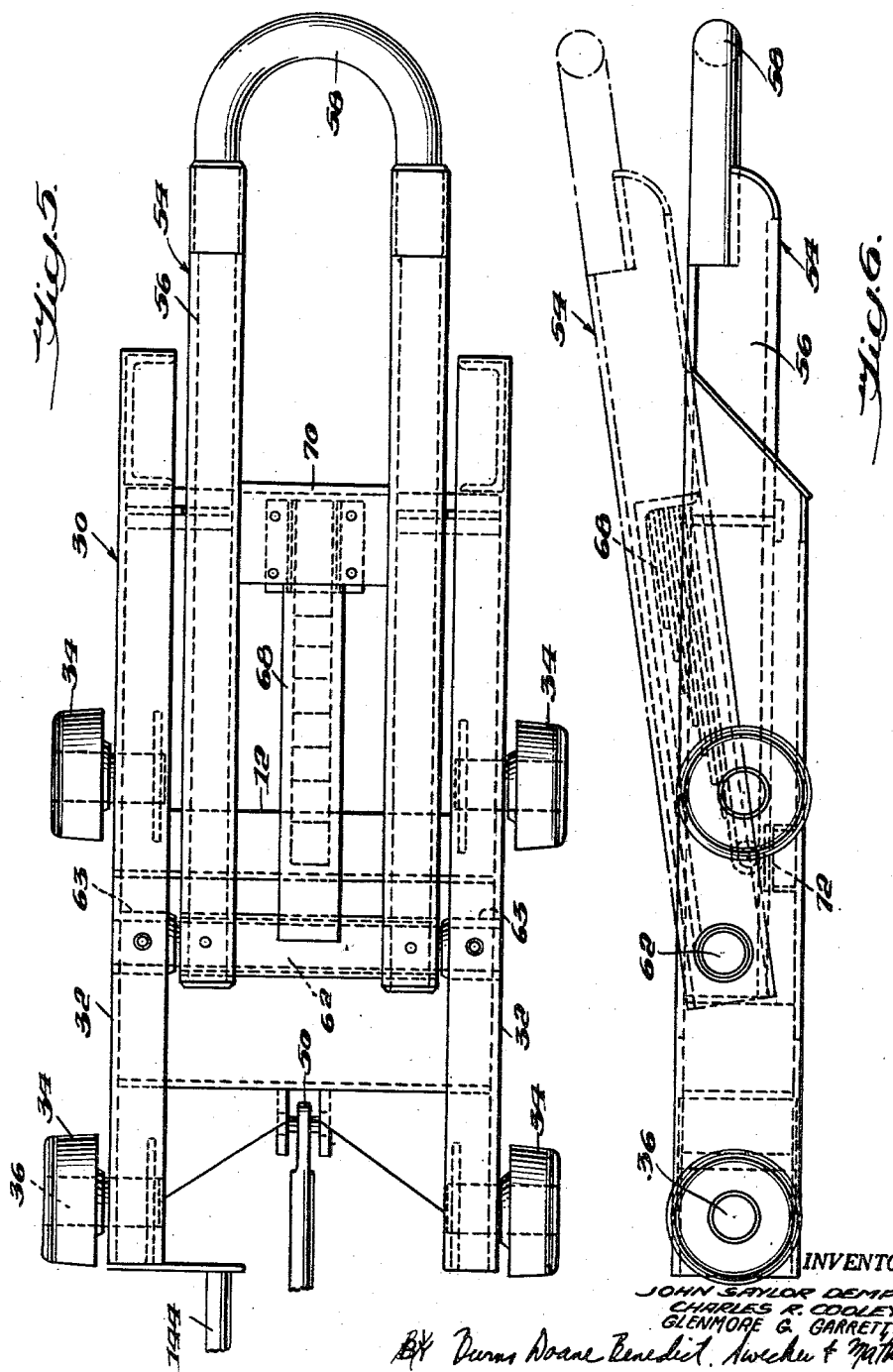

United States Patent Office 3,195,749
Patented July 20, 1965

3,195,749
CONTAINER LOADING AND UNLOADING MECHANISM
John Saylor Dempster, Charles R. Cooley, and Glenmore G. Garrett, Jr., Knoxville, Tenn., assignors to Dempster Brothers, Inc., Knoxville, Tenn., a corporation of Tennessee
Filed Feb. 15, 1962, Ser. No. 173,511
5 Claims. (Cl. 214—505)

This invention relates to improvements in container loading and unloading mechanism of the type for loading or unloading one or more large size containers with respect to a transporting vehicle.

In the handling of materials of various types, containers as large as a standard vehicle body often are employed. These containers are filled when resting on the ground, or other supporting surface, and then loaded onto a vehicle and transported to a distant point where they are unloaded from the vehicle or the contents discharged therefrom. If the containers remain on the vehicle, they may be returned to the location of filling or to a new location and placed on the ground again for refilling.

The mechanism for loading and unloading large size containers with respect to a vehicle, in order to be versatile and have a variety of uses, must be able to lift the containers from the ground or other surface onto the vehicle, or set the container on the ground from the vehicle with a minimum of tilting of the container and jarring thereof. Also, the mechanism must provide for control over the movement of the container at all times and prevent inadvertent or accidental movement thereof.

Previous types of mechanism for loading and unloading large size containers with respect to vehicles have used cable type devices, but these have not been entirely satisfactory. Cable type devices do not afford adequate control over the movement of the container, and in general, relay on gravity to allow the containers to roll off the vehicle. Additionally, cable type devices usually require the operator to leave the cab in order to attach the cable to the container or to unlatch the cable from the container. Not infrequently cables break, and therefore they are inherently dangerous.

One object of this invention is to provide an improved mechanism for loading or unloading a detachable body or large size container with respect to a vehicle.

Another object of this invention is to provide a device for pulling a large size detachable body or container onto a vehicle and for pushing such body or container off of the vehicle by means of a power operated mechanism.

Another object of this invention is to provide mechanism for loading and unloading a detachable body or large size container with respect to a vehicle whereby the operator can control the movements of the container without leaving the cab of the vehicle.

Another object of this invention is to provide mechanism for pulling or pushing a detachable body or large size container with respect to a vehicle whereby the operator has full control over the movement of the body or container onto or off of the vehicle.

Another object of this invention is to provide mechanism for loading or unloading a detachable body or large size container with respect to a vehicle wherein the body size container can be transferred between the vehicle and a raised platform, or between the vehicle and the ground or other supporting surface which is at a level below the chassis of the vehicle.

Another object of this invention is to provide mechanism for loading or unloading a detachable body or large size container with respect to a vehicle, which mechanism is provided with a tipping frame adjustable to different tilted positions and wherein the body or container is movable or off the frame without danger of inadvertent or accidental movement with respect thereto.

These objects may be accomplished generally by providing a transporting vehicle with a tipping frame pivotally mounted to the rear of the vehicle chassis and swingable to raised and lowered tilted positions. A body or container connecting mechanism is mounted on and movable along the tipping frame and is adapted to be detachably connected with a separate body or large size container for pulling or pushing the body or container onto or off of the tipping frame. Suitable power devices are provided for raising and lowering the tipping frame and for propelling the connecting mechanism in a reciprocating manner longitudinally of the vehicle and tipping frame.

The connecting mechanism of this invention includes a carriage assembly with a bail assembly pivoted thereto and having a transversely extending loop portion. The bail assembly extends beyond the rear of the carriage assembly and is biased by a spring to extend above the top surface of the carriage assembly. The loop portion is adapted to engage one of a series of hook stations on a hook bar that extends longitudinally of the detachable bodies or large size containers which are to be accommodated by the loading mechanism.

A group of safety latch devices having hook members are positioned along the outsides of the tipping frame at longitudinally spaced-apart points. The hook members are pivotally mounted to swing to a raised or container engaging position wherein they extend above the top surface of the tipping frame or to a lowered or container disengaging position wherein they extend below the surface. The hook members are biased to their raised position by a spring and can be swung to their lowered position by a power device controlled by the operator.

The containers to be accommodated by the loading mechanism are provided with series of pins along each side thereof positioned at spaced-apart points longitudinally of the containers and in position to be engaged by the hook members of the latch devices. The rear portion of each hook member is provided with a cam surface so that the pins on the containers engage the cam surface and push the hook member downwardly against the force of the spring when the containers are moved onto the tipping frame. Because the hook members are normally biased to their raised position, the containers cannot move off of the tilting frame unless the power devices are actuated to move the hook members to their lowered position. The latch devices serve to prevent inadvertent sliding movement of the container off of the tipping frame when the tipping frame is raised either in an unloading or a loading operation of the container.

This embodiment of the invention is illustrated in the accompanying drawings in which:

FIG. 1 is a side elevation view of a vehicle having the container loading and unloading mechanism of this invention applied thereto, wherein the tipping frame and a container are shown in various positions with respect to the vehicle;

FIG. 2 is an enlarged plan view of a tipping frame;

FIG. 3 is a side elevation view corresponding with FIG. 2;

FIG. 4 is a cross sectional and elevation view taken along line 4—4 of FIG. 3;

FIG. 5 is an enlarged plan view of a carriage assembly;

FIG. 6 is a side elevation view corresponding with FIG. 5 and showing the bail assembly in raised and lowered positions;

FIG. 7 is an enlarged side elevation view of a latch device mounted on the tipping frame;

FIG. 8 is a fragmentary view of a switch in a control system which operates the latch devices; and FIG. 9 is a schematic diagram of a control system for operating the latch devices.

The invention is illustrated as applied to a motor vehicle 2 having a chassis 4 supported on suitable wheel and axle assemblies including the rear axle assemblies 6 shown in FIG. 1. The vehicle is power driven in the usual manner under control of an operator located within a cab 8. The chassis frame 4 should be of sufficient length to receive a separable body or a large size container generally the same size as a conventional truck body. If desired, the chassis frame may be that of a trailer separated from the tractor portion thereof, although functioning otherwise in the manner described.

A tipping frame 10 is mounted on the vehicle chassis 4 and extends longitudinally of the vehicle and vertically over the chassis. The tipping frame 10 includes a pair of spaced-apart, channel-shaped members 12 (FIG. 4) on opposite sides thereof in vertical alignment with the members of the chassis 4. The channel members 12 are suitably braced and spaced apart by intermediate connecting members which cooperate to form a unitary structure for receiving thereon the containers to be accommodated.

The rear of the chassis frame 4, at each lateral side, is equipped with depending brackets 14. A pivot shaft 16 is supported on and extends laterally between the brackets 14. At the rear of the tipping frame 10, at each lateral side, is a depending bracket 18, each of which is mounted upon and supported by outwardly extending portions of the pivot shaft 16. In this manner, the tipping frame 10 is pivotally mounted on the chassis 4 for swinging movement relative thereto to raised and lowered positions, as illustrated in FIG. 1.

Behind the cab 8, the chassis 4 is provided with depending brackets 22, welded or otherwise secured rigidly to opposite sides of the chassis. The brackets 22 support a cross shaft 24 which is journaled in bearings secured to the brackets. The shaft 24 extends laterally beyond the outside faces of the brackets 22, and has mounted thereon the lower ends of power devices 26, the upper ends of which are pivotally connected with pins 28 on opposite sides of the tipping frame 10. The power devices 26 may be of any suitable or desired form, for example hydraulic cylinder and piston assemblies capable of telescoping movement in raising and lowering the tipping frame 10.

The channel members 12 of the tipping frame 10 form opposed trackways receiving therebetween a carriage 30 (FIGS. 4, 5 and 6). The carriage assembly 30 includes a pair of longitudinal side members 32 spaced-apart and located in relatively close relation to the inner faces of the channel members 12 of the tipping frame. The side members 32 are held in spaced relation and braced by cross members.

Mounting members 34 are positioned on the side members 32 at longitudinally spaced points and are connected with the side members 32 by stub axle 36. The mounting members 34 may be in the form of rollers, as shown in FIGS. 4, 5 and 6, although slides or other suitable means such as block-shaped members may be employed. The mounting members 34 form bearings within the channel members 12 for supporting and guiding the carriage 30 lengthwise of the tipping frame 10.

The carriage 30 is propelled back and forth longitudinally of the tipping frame 10 by a power device 40 which may be of conventional construction including a cylinder 42 pivotally mounted at its forward end at 44 to an end member 46 on the tipping frame 10 and, also including a piston rod 48 pivotally mounted at 50 to the front of the carriage assembly 30.

A container connecting device or bail assembly 54 is mounted on the carriage 30 and is comprised of side members 56 spaced in parallel relation inside the side members 32 of the carriage. The members 56 of the bail assembly 54 are connected at their rearward end by a loop portion 58. The forward ends of the members 56 are pivotally mounted to the carriage 30 by a shaft 62 which extends between the side members 32 and which is journaled thereto at 63. The entire bail assembly 54 may swing vertically to a raised position shown in broken lines in FIG. 6, or to a lowered position shown in full lines.

A leaf spring 68 is mounted to a cross plate 70 extending between the side members 56 of the bail assembly 54 and bears upon a member 72 extending between the side members 32 of the carriage 30. The force of the spring 68 tends to push the bail assembly 54 to its raised position so that the loop portion 58 extends above the top surface of the side members 32 and above the top surface of the channel members 12 of the tipping frame 10. The bail assembly 54 can be moved downwardly against the force of the spring 68 to its lowered position so that the bail assembly 54 lies between the members 32 of the carriage assembly 30.

Latch assemblies 80 are mounted on the sides of the channel members 12 of the tipping frame 10, and each latch assembly includes a hook member 82 pivotally mounted to a channel member 12 by means of a stub shaft 84. A hook surface 86 of each hook member 82 opens to the front of the tipping frame 10, and the rear portion of each hook member 82 is provided with a cam surface 88 facing rearwardly.

Each hook member 82 is movable to a raised position wherein the hook surface 86 and the cam surface 88 extend above the top surface of the channel member 12 of the tipping frame 10, and each hook member is movable to a lowered position wherein the hook surface 86 and the cam surface 88 are below the top surface of the channel member 12. Each hook member 82 is biased to its raised position by a tension spring 90 which extends between a bracket 92 on the channel member 12 and another bracket 94 on the hook member 82. Upward swinging movement of the hook member 82 is limited by a stop member 96 fixed on the channel member 12.

Each hook member 82 can be moved to its lowered position by a power device 100 which may be a conventional cylinder and piston assembly operated by air pressure or hydraulic pressure. A cylinder 102 of the power device 100 is pivotally mounted at 104 to a bracket 106 on the channel member 12. The free end of a piston rod 108 of the power device 100 is pivotally mounted at 110 to an ear 114 depending from the hook member 82.

When suitable air pressure, for example, controlled by the operator is applied to the power device 100, the piston rod 108 is caused to extend, thereby swinging the hook member 82 around the axis of its pivot shaft 84 to its lowered position. Downward swinging movement of the hook member 82 is limited by a stop member 118 fixed on the channel member 12. The raised position of the hook member 82 is illustrated in full lines in FIG. 7 and the lowered position of the hook member is illustrated in broken lines.

In FIGS. 8 and 9 there is illustrated a switching arrangement for controlling the latch assemblies 80. A supply of air pressure 122 may be provided on the vehicle 2 and connected by a line 124 to a three-way valve 126 which can be solenoid operated by the operator while located within the cab 8. The valve 126 may be opened to allow air pressure to pass through a line 128 to each one of the power devices 100. In this manner, the power devices 100 are operated in unison under control of the single valve 126. The operator may manipulate the valve 126 to allow air pressure to be exhausted from the power devices 100. Actuation of the valve 126 to allow air pressure to pass to the power devices 100 causes the hook members 82 to be swung to their lowered position. When the valve 126 is actuated to exhaust air pressure from the power devices 100, the springs 90 cause the hook members 82 to swing to their raised position.

A limit switch 130 is mounted on the tipping frame 10 by any suitable means such as a bracket 132 (FIG. 2) and includes a movable arm 134 having a follower roller 136 on the free end thereof aligned with an opening 138 in a longitudinally extending tube 140 which is fixed to the tipping frame 10 between the end member 46 and a cross member 142.

A rod 144 (FIGS. 5 and 8) is connected at one end to the carriage 30 and is movable within the tube 140 lengthwise of the tipping frame 10 in corresponding movement with the carriage 30. The rod 144 is positioned within the tube 140 so as to engage the follower roller 136 of the limit switch 130 in order to push the arm 134 away from the tube 140.

Movement of the carriage 30 to the rear of the tipping frame 10 pulls the rod 144 to the right with reference to FIG. 8. As the carriage 30 approaches the extreme rear of the tipping frame 10, the end 148 of the rod 144 will move past the opening 138 in the tube 140, and the arm 134, which is spring biased, will move into the opening 138 as shown in broken lines in FIG. 8. The end 148 of the rod 144 is beveled so that as the carriage 130 moves to the front of the tipping frame 10, the rod 144 can engage the follower roller 136 and move easily past the arm 134 pushing it away from the tube 140.

The limit switch 130 actuates the valve 126 to control the exhausting of air pressure from the cylinders 102 of the power devices 100. When any portion of the rod 144 extends over the opening 138, the arm 134 causes the limit switch 130 to close the valve 126 so that air pressure will not be exhausted from the cylinders 102 of the power devices 100. After the carriage 30 has been moved adjacent the rear of the tipping frame 10 and the arm 134 is allowed to move into the opening 138, the limit switch 130 will cause the valve 126 to exhaust air pressure from the cylinders 102.

Accordingly, each time that the carriage 30 is moved adjacent the rear of the tipping frame 10, the limit switch 130 will be actuated and in turn cause the valve 126 to exhaust air pressure from the cylinders 102. However, when the rod 144 is within the tube 140, the limit switch 130 is deactuated so that air pressure can be applied to the cylinders 102 or relieved therefrom by the valve 126 under control of the operator.

A detachable body or large size container 150 which may be used in connection with the vehicle 2 and the loading mechanism is illustrated in FIG. 1. The loading mechanism may accommodate containers as large as a standard truck body and smaller size containers as well. Except for the longitudinal dimension of the container which is variable, but limited to the size of the tipping frame, generally the container may be of any suitable size and type desired. For example, the container may have an open or closed top and have various combinations of lids, doors and tailgates. In addition to box-shaped containers, various other arrangements for handling materials of various types may be provided, such as different kinds of cargo containers, platforms, stake bodies, tanks, etc.

Each container, such as the container 150, to be handled by the loading mechanism is provided with a sub-frame structure (FIG. 10) which includes a pair of beams 152 spaced apart a distance corresponding with the spacing of the channel members 12 of the tipping frame 10 and extending the length of the container. These beams 152 form runners for supporting the container 150 upon the tipping frame 10 or on the ground or other supporting surface. The forward ends of the beams 152 are curved upwardly in the form of bows to facilitate the guiding of the container 150 onto the tipping frame. The configuration may be of a blunt nose type such as shown in FIG. 1 or of a continuous curve type such as illustrated in FIG. 10. Suitable braces and ribs 154 extending transversely of the container may be employed as necessary to strengthen the subframe and container structure.

Extending lengthwise of the container intermediate the beams 152 is a hook bar 156 which is provided with a plurality of hook stations 158 spaced along the length thereof for engagement of the loop portion 58 of the bail assembly 54. The number and spacing of the hook stations 158 may vary depending upon the length of the container and the length of travel of each stroke of the carriage 30.

Each hook station 158 is formed with a pair of opposed hook surfaces 160 opening downwardly with protruding lips 162 in position to be overlapped alternately by a shuttle member 164. The shuttle member 164 is pivoted at 166 on the hook bar 156 for swinging movement but normally hangs downwardly between the opposed hook surfaces 160. By proper actuation of the cylinder 40, the operator can move the carriage 30 and thus the bail assembly 54 so that the loop portion 58 will engage either the front or rear hook surface 160 of any one of the hook stations 158. The shuttle 164 allows the bail portion 58 to move past a hook station 158 without engaging either hook surface 160. However, upon a slight reverse movement of the carriage 30, the loop portion 58 will move the shuttle away from the corresponding lip 162 and slide easily into contact with a hook surface 160.

In picking up or loading a container 150, the vehicle 2 is backed up so that the rear of the vehicle is adjacent the front end portion of the container while it is resting upon the ground, or other supporting surface. Then, upon actuation of the cylinders 26, the tipping frame 10 is moved to an elevated or raised position about its pivot shaft 16 as illustrated in FIG. 1 in full lines. With the tipping frame 10 raised, the operator then actuates the cylinder 40 to move the carriage 30 to the lower end of the tipping frame. The bail assembly 54 normally is in a raised position with respect to the carriage 30, as shown in broken lines in FIG. 6, and will be projected below the lower end of the inclined tipping frame 10 and beneath the forward end portion of the container 150.

If the vehicle 2 and the container 150 are properly aligned, the bail portion 58 will enter a forward hook station 158 of the hook bar 156. The loop portion 58 is caused to slide upwardly into one of the forward hook stations 158 after the bail assembly 54 has been depressed against the action of the spring 68 due to the sliding of the loop portion 58 underneath the hook bar 56. In addition, the angle of incline of the tipping frame 10 may be adjusted as necessary by the operator through proper manipulation of the cylinders 26 to cause the bail portion 58 to make proper entry into one of the forward hook stations.

After hook engagement between the carriage assembly 30 and the container 150 in this manner, the operator may actuate the power device 40 to move the carriage assembly 30 toward the front of the vehicle through a full stroke of the power device 40, or through a partial stroke, as desired. This will put the container 150 on to the tipping frame 10. Then, the carriage assembly 30 and the bail assembly 54 can be moved rearwardly so that the loop portion 58 might engage an intermediate or a rear hook station 158. Upon forward movement of the carriage assembly again, the container 150 will be pulled farther onto the tipping frame 10. As the container 150 is pulled onto the vehicle in this manner, the beams 152 will slide along the upper surface of the channel members 12 of the tipping frame 10. While the container is being pulled onto the vehicle, the operator may lower the tipping frame by proper manipulation of the cylinders 26.

In order to unload or discharge the container 150 from the vehicle, the loading operation is reversed. By actuation of the power device 40, the carriage assembly 30 can be moved to the front of the tipping frame 10 so that the loop portion 58 engages an intermediate hook station 158. The carriage assembly 30 is then moved toward the rear of the tipping frame and the container 150 is pushed toward the rear of the vehicle. The tipping frame 10 can be varied in its angle of incline in order to facilitate the unloading of the container, if the container is to be set on the ground or other supporting surface at a level below the level of the tipping frame.

Under certain circumstances during a loading or unloading operation of a container, when the tipping frame 10 is inclined at a steep angle, there is a possibility that the container may slide inadvertently in a longitudinal direction rearwardly of the tipping frame during the time that the loop portion 58 of the bail assembly 54 is disconnected from one of the hook stations. At this point, during a loading or unloading operation, the friction between the beams 152 and the top surface of the channel members 12 may not be sufficient to prevent sliding of the container 150. Such inadvertent rearward sliding movement of the container 150 is prevented by the safety latch assemblies 80.

Each container, such as the container 150, which is to be accommodated by the hoisting mechanism, is provided with a series of outwardly extending pins or attaching devices 170 which are rigidly mounted at longitudinally spaced-apart points on the beams 152. The hook members 82 of the latch assemblies 80 are positioned so that when they are in their raised position, they are in the path of the pins 170. Thus, when the hook members 82 are raised, the pins 170 will be engaged by the hook surfaces 86 of the hook members 82 and rearward movement longitudinally of the tipping frame of the container 150 will be prevented.

Throughout the loading operation of the container 150, air pressure is exhausted from the cylinders 102 of the power devices 100, and the springs 90 cause the hook members 82 to be held in a raised position. As the container 150 is pulled onto the tipping frame 10, the pins 170 move against the cam surfaces 88 on the rear side of the hook members 82 and, by a camming action, cause the hook members 82 to move downwardly far enough so that the pins 170 can move over and past the hook members.

At the beginning of an unloading operation of the container 150, the operator actuates the valve 126 so that air pressure from the pressure supply source 122 is caused to enter each of the cylinders 102 of the power devices 100, causing the hook members 82 to move to their lowered or container disengaging position. The carriage assembly 30 is then propelled in a rearward direction pushing the container 150 rearwardly. The pins 170 are free to move past the lowered hook members 82.

As the carriage assembly 30 nears the extreme end of the tipping frame 10, the rod 144 moves past the opening 138 and the arm 134 of the limit switch 130 is free to move inwardly of the tube 140. This movement of the arm 134 causes the limit switch 130 to actuate the valve 126 which in turn exhausts air pressure from each of the cylinders 102 of the power devices 100. Exhausting of the air pressure from the cylinders 102 allows the springs 90 to pull the hook members 82 to their raised or container engaging position. The hook members 82 are then in position to engage the pins 170 to prevent further rearward movement of the container 150. The loop portion 58 of the bail assembly 54 can then be removed from a hook station 158 without the container 150 inadvertently moving rearwardly of the vehicle, and the carriage assembly 30 is free to be moved toward the front of the tipping frame to begin another stroke.

As the carriage assembly 30 is moved forwardly, the rod 144 slides forwardly in the tube 140, and the end 148 engages the follower roller 136 to push the arm 134 away from the rod 144. This closes the limit switch 130 and thereby closes the valve 126. Air pressure is not supplied to the power devices 100, however, until the operator actuates the valve 126.

After the carriage assembly 30 has been moved forward on the tipping frame 10 and the loop portion 58 engaged within one of the hook stations 158, the operator then actuates the valve 126 again to allow air pressure from the pressure supply source 122 to pass into each of the cylinders 102 of the power devices 100 causing the hook members 82 to be moved to their lowered position. Then, the operator can actuate the power device 40 to cause the carriage assembly 30 to move toward the rear again to push the container 150 farther off of the tipping frame while the pins 170 pass over the lowered hook members 82. Again, as the carriage assembly 30 nears the rear of the tipping frame 10 and the end 148 of the rod 144 passes the opening 138, the arm 134 of the limit switch 130 is actuated to cause air pressure from the cylinders 102 to be exhausted through the valve 126. This allows the springs 90 to pull the hook members 80 to their raised position so that further rearward movement of the container 150 is prevented due to engagement of the pins 170 with the hook surfaces 86 of the hook members 82. This series of operations is repeated until the container 150 is off the tipping frame 10.

The safety latch devices 80 serve automatically to prevent inadvertent rearward movement of the container when the tipping frame is raised. The operator can lower the latch devices in order to move a container off the vehicle, but the safety feature provided by the latch device does not require the operator's attention.

While the invention has been illustrated and described in a certain embodiment, it is recognized that other variations and changes may be made therein, without departing from the invention as set forth in the claims.

We claim:

1. In a container loading and unloading mechanism of the character described, the combination of a frame adapted to be inclined and to receive and support thereon a separable container; connecting means on the frame and movable lengthwise of the frame for releasably engaging and moving a container onto or off of the frame; latch means on the frame movable to a first position to engage a container at any one of a number of points for preventing movement of the container off the frame when the frame is inclined and the connecting means is not engaged with the container, and movable to a second position to allow movement of the container onto or off of the frame; spring means for biasing the latch means to the first position; fluid pressure actuated power means for moving the latch means to the second position; operator-controlled valve means for controlling the flow of fluid pressure to or exhausting fluid pressure from the power means; switch means for actuating the valve means to exhaust fluid pressure from the power means; and means on the connecting means for actuating said switch means when the connecting means is adjacent one end of the frame.

2. In a container loading and unloading mechanism of the character described, the combination of a frame adapted to receive and support thereon a separable container; connecting means on the frame and movable lengthwise of the frame for releasably engaging and moving a container onto or off of the frame, latch means on the frame movable to a first position to engage a container for preventing movement of the container off the frame, and movable to a second position to allow movement of the container onto or off of the frame; means for moving the latch means to one of said positions, fluid pressure actuated power means for moving the latch means to the other position; operator-controlled valve means for controlling the flow of said pressure to or exhausting fluid pressure from the power means; switch means for actuating the valve means to exhaust fluid pressure from the power means; and means on the connecting means for actuating said switch means when the connecting means is adjacent one end of its movement on the frame.

3. In equipment mounted on a vehicle, the combination of a frame, a container device adapted to be moved onto or off the frame and having a series of engagement surfaces spaced therealong, connecting means mounted on the frame for back and forth movement with respect thereto and movable successively into connection with the container engagement surfaces to move one step, a series of stop means on the container device, a hook on the frame in position for engagement with the respective stop means, means actuated by movement of the connecting means to a position adjacent an end of its movement in said one direction for moving the hook into engagement with the stop means and holding it in engagement therewith during movement of the connecting means into connection with the next engagement surface of the container for movement of the container a second step, and means for moving the hook out of engagement with the stop means upon a next step of movement of the connecting means and container.

4. In equipment mounted on a vehicle, the combination of a frame mounted on the vehicle for tilting movement to different positions with respect thereto, a container device adapted to be moved onto or off the frame and having a series of engagement surfaces spaced therealong, a carriage mounted on the frame for guided back and forth movement with respect thereto, connecting means on the carriage and movable successively into connection with the container engagement surfaces to cause movement of said container device step by step relative to the frame, a series of stop means on the container device, a hook in position for engagement with the respective stop means in the tilted position of the frame, means actuated by movement of the carriage to a position adjacent an end of its movement in said one direction for moving the hook into engagement with the stop means and holding it in engagement therewith during movement of the connecting means into connection with the next engagement surface of the container for movement of the container a second step, and means for moving the hook out of engagement with the stop means upon a next step of movement of the carriage and container.

5. In equipment mounted on a vehicle, the combination of a container device mounted on the vehicle for movement in inclined direction onto or off the vehicle, said container device having a series of engagement surfaces by which the container device may be moved with respect to the vehicle, connecting means mounted on the vehicle for back and forth movement with respect thereto and movable successively into connection with the container engagement surfaces of said series to cause a step of movement of the container device relative thereto, a series of stop means on the container device and spaced therealong substantially equal to the spacing of the engagement surfaces of said series, a hook mounted on the vehicle in position for engagement with the respective stop means of said series, means actuated by movement of the connecting means to a position adjacent an end of one step of its movement in one direction for moving the hook into engagement with the stop means and holding it in engagement therewith during movement of said connecting means into engagement with the next successive engagement surface on the container for movement of the container a second step, and means for moving the hook out of engagement with the stop means upon said second step of movement of the connecting means and container.

References Cited by the Examiner
UNITED STATES PATENTS

| | | | |
|---|---|---|---|
| 1,293,664 | 2/19 | Avery | 214—38.22 |
| 1,591,655 | 7/26 | Callison | 214—38.8 |
| 1,830,740 | 11/31 | Leech et al. | 214—38.20 X |
| 2,216,972 | 10/40 | Gibson et al. | 214—65 |
| 2,521,727 | 9/50 | Kappen | 214—518 |
| 2,623,759 | 12/52 | Forbas | 280—179 |
| 2,789,715 | 4/57 | Filipoff et al. | 214—517 |
| 3,042,228 | 7/62 | Frangos. | |
| 3,049,378 | 8/62 | Nelson | 214—517 |
| 3,107,020 | 10/63 | Dempster et al. | 214—505 |

HUGO O. SCHULZ, *Primary Examiner.*
GERALD M. FORLENZA, *Examiner.*